US011939261B1

(12) United States Patent
Huang et al.

(10) Patent No.: US 11,939,261 B1
(45) Date of Patent: Mar. 26, 2024

(54) LASER GLASS DOPED WITH HIGH CONCENTRATION OF MID-INFRARED FLUOROINDATE AND PREPARATION METHOD THEREOF

(71) Applicant: China Jiliang University, Zhejiang (CN)

(72) Inventors: Feifei Huang, Zhejiang (CN); Shiqing Xu, Zhejiang (CN); Junjie Zhang, Zhejiang (CN); Ying Tian, Zhejiang (CN); Bingpeng Li, Zhejiang (CN); Youjie Hua, Zhejiang (CN)

(73) Assignee: CHINA JILIANG UNIVERSITY, Zhejiang (CN)

( * ) Notice: Subject to any disclaimer, the term of this patent is extended or adjusted under 35 U.S.C. 154(b) by 0 days.

(21) Appl. No.: 18/486,327

(22) Filed: Oct. 13, 2023

(30) Foreign Application Priority Data

Nov. 28, 2022 (CN) ........................ 202211504509.0

(51) Int. Cl.
*C03C 3/32* (2006.01)
*C03C 3/247* (2006.01)

(52) U.S. Cl.
CPC .............. *C03C 3/325* (2013.01); *C03C 3/247* (2013.01); *C03C 2203/10* (2013.01)

(58) Field of Classification Search
CPC ................................ C03C 3/325; C03C 3/247
See application file for complete search history.

(56) References Cited

U.S. PATENT DOCUMENTS 5,338,607 A 8/1994 Kawamoto et al.
5,480,845 A 1/1996 Maze et al.
2007/0010390 A1 1/2007 Margaryan et al.
2020/0002218 A1 1/2020 Choi et al.

FOREIGN PATENT DOCUMENTS

CN 112010557 A 12/2020
CN 113754279 A 12/2021
CN 113816604 A 12/2021

OTHER PUBLICATIONS

Search Report for China Application No. 202211504509.0.
Notification to Grant Patent for China Application No. 202211504509.0, dated Aug. 1, 2023.

*Primary Examiner* — Elizabeth A. Bolden
(74) *Attorney, Agent, or Firm* — Pilloff Passino & Cosenza LLP; Sean A. Passino; Rachel K. Pilloff

(57) ABSTRACT

A laser glass doped with high concentration of mid-infrared fluoroindate and a preparation method thereof are provided in the present application, belonging to the technical field of luminescent glass. The laser glass doped with high concentration of mid-infrared fluoroindate includes the raw materials in parts by mole percentage: 27-38 parts of $InF_3$, 13 parts of $ZnF_2$, 10 parts of $GdF_3$, 19 parts of $BaF_2$, 5 parts of $CaF_2$, 10 parts of $SrF_2$, 5-15 parts of $Al(PO_3)_3$ and 1-11 parts of $ErF_3$.

8 Claims, 4 Drawing Sheets

LASER GLASS DOPED WITH HIGH CONCENTRATION OF MID-INFRARED FLUOROINDATE AND PREPARATION METHOD THEREOF

CROSS-REFERENCE TO RELATED APPLICATIONS

This application claims priority to Chinese Patent Application No. 202211504509.0, filed on Nov. 28, 2022, the contents of which are hereby incorporated by reference.

TECHNICAL FIELD

The present application belongs to the technical field of luminescent glass, and in particular to a laser glass doped with high concentration of mid-infrared fluoroindate and a preparation method thereof.

BACKGROUND

Mid-infrared lasers in the 3-5 micrometers (m) band are of great application value in the fields of remote sensing communications, military defence and control, and detection of gaseous pollutants. The available cases of 3.5 μm luminescent glasses reported are mainly based on $Er^{3+}$:$^4F_{9/2}$→$^4I_{9/2}$ transition. However, the lifetime of erbium (Er) ions in the lower energy level of $^4I_{9/2}$ is higher than that of the higher energy level of $^4F_{9/2}$, where the ions population inversion is impaired and the $Er^{3+}$:$^4F_{9/2}$→$^4I_{9/2}$ transition is attenuated, and self-termination may even be caused.

SUMMARY

In view of this, the present application provides a laser glass doped with high concentration of mid-infrared fluoroindate and a preparation method thereof. By combining the adjustment of raw material composition with the preparation method, a mid-infrared fluoroindate laser glass with a wide range of transmittance, high thermal stability, low phonon energy, low hydroxyl content, and high concentration of rare earth doping is prepared, which is an ideal matrix material for mid-infrared wavelength lasers as it obtains strong 3.5 micrometers (m) fluorescence under the pumping of a laser diode at a wavelength of 650 nanometers (nm).

In order to achieve the above objectives, the present application provides following technical schemes:

a laser glass doped with high concentration of mid-infrared fluoroindate, including following raw materials in parts by mole: 27-38 parts of $InF_3$, 13 parts of $ZnF_2$, 10 parts of $GdF_3$, 19 parts of $BaF_2$, 5 parts of $CaF_2$, 10 parts of $SrF_2$, 5-15 parts of $Al(PO_3)_3$ and 1-11 parts of $ErF_3$.

Optionally, following raw materials are included in parts by mole: 27 parts of $InF_3$, 13 parts of $ZnF_2$, 10 parts of $GdF_3$, 19 parts of $BaF_2$, 5 parts of $CaF_2$, 10 parts of $SrF_2$, 5 parts of $Al(PO_3)_3$, and 11 parts of $ErF_3$.

The present application also provides a preparation method of the laser glass doped with high concentration of mid-infrared fluoroindate, including following steps:

- S1, weighing raw materials by mass, obtaining a mixture by uniformly grinding the raw materials;
- S2, melting in a pit furnace, obtaining a glass liquid until melting reaches homogenization and clarification; and
- S3, pouring the glass liquid into a mould preheated to a fixed temperature, followed by annealing in a muffle furnace for a fixed time and cooling to a room temperature, then obtaining the laser glass doped with high concentration of mid-infrared fluoroindate.

Optionally, conditions for the melting include: melting at 900-1000 degrees Celsius (° C.) for 20-30 minutes (min) in a stable atmospheric environment with a constant temperature and humidity, where the constant temperature and humidity include temperature of 20° C. and humidity of 20%.

In a process of the melting, high-purity oxygen is introduced as atmosphere protection to remove water from the glass liquid, and a homogenized and clarified glass liquid is obtained by removing the water.

Optionally, the mould preheated to the fixed temperature includes a temperature of 280° C.-330° C.

Optionally, conditions of the annealing include: holding temperature at 230° C.-280° C. for 2-3 hours (h).

Compared with the prior art, the present application has the beneficial effects that:

- the present application uses $InF_3$ as the main element, and prepares an fluoroindate glass with a network modifier through the proportioning of each component, with high thermal stability and mechanical properties, and the good optical properties of the fluoride glass maintained at the same time; it is therefore a reliable alternative to mid-infrared fiber-optic gaining medium with improved mid-infrared luminescence performance;
- the present application adopts the melting method to prepare and obtain fluoroindate laser glass, with a simple preparation method and low production cost, avoiding the evaporation of the glass component and preparing an optical glass with a homogeneous component;
- the fluoroindate glass prepared by the present application has a low melting temperature, with a relative low glass transition temperature of 421° C. and crystallization temperature of 521° C.; it has good thermal stability and can be easily prepared and stretched to produce optical fibers;
- the mid-infrared transmittance of the fluoroindate glass prepared by the present application is as high as 92.13% and the hydroxyl absorption coefficient is as low as 0.2133 inverse centimeter ($cm^1$), suggesting an important application in the mid-infrared wavelength band;
- the present application optimizes fluoroindate glass through component modification, in which the components are proportioned to each other to achieve high concentration doping of Er ions, and the luminescence performance is greatly improved;
- under the pumping of a 650 nm laser diode, the fluoroindate laser glass prepared by the present application obtains strong luminescence in the range of 3200-3700 nm with a central wavelength at about 3500 nm, based on the radiative transition between the $Er^{3+}$:$^4F_{9/2}$→$^4I_{9/2}$ energy levels.

BRIEF DESCRIPTION OF THE DRAWINGS

To illustrate the technical schemes in the embodiments or prior art of the present application more clearly, the accompanying drawings to be used in the embodiments are briefly described hereinafter, and it is obvious that the accompanying drawings in the description hereinafter are only some embodiments of the present application, and that for a person of ordinary skill in the field, other accompanying drawings are available on the basis of the accompanying drawings without any creative labor.

DETAILED DESCRIPTION OF THE EMBODIMENTS

Figure 1:
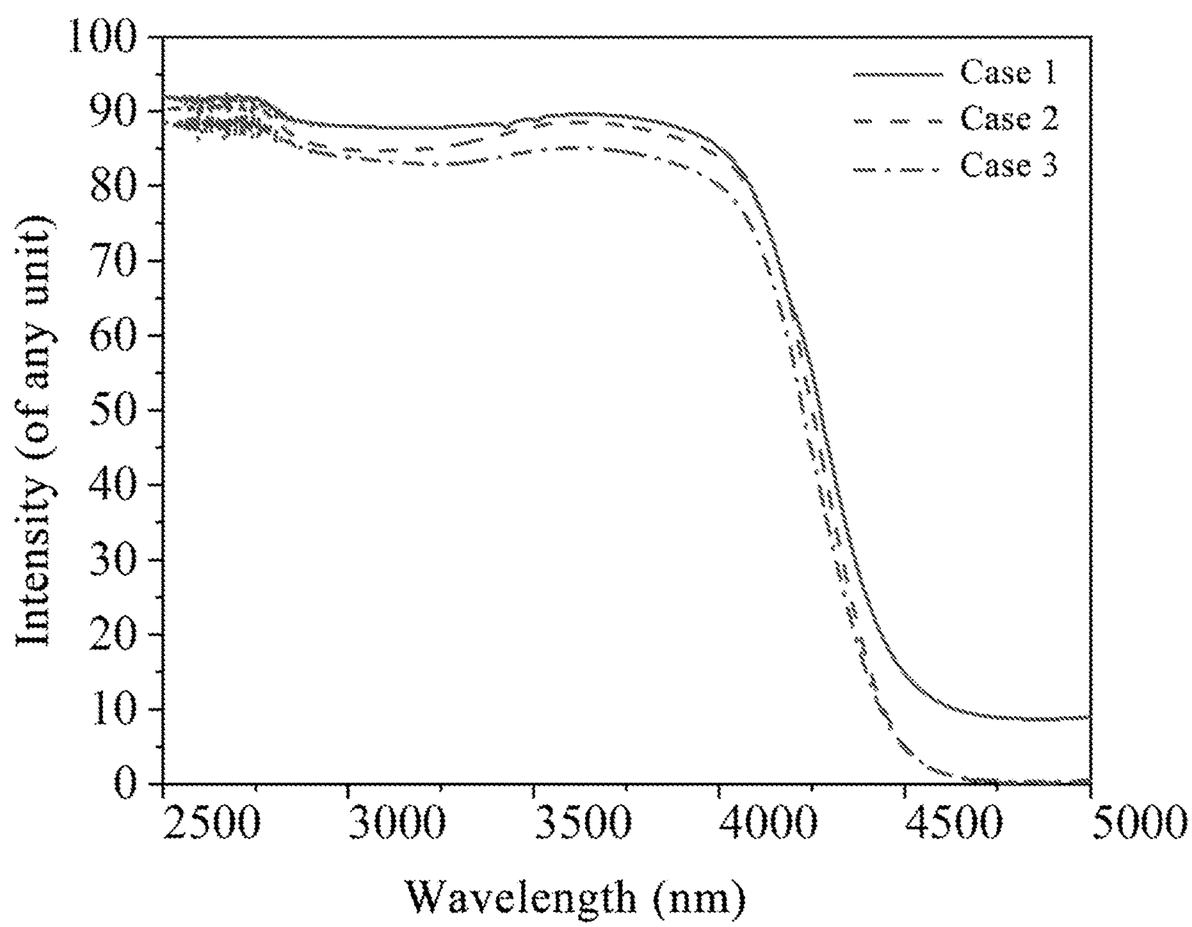
FIG. 1 illustrates Fourier infrared transmission curves of fluoroindate laser glasses prepared in Embodiments 1-3 (corresponding to Cases 1-3 in the figure) of the present application in a range of 2500-5000 nanometers (nm).

A number of exemplary embodiments of the present application are now described in detail, and this detailed description should not be considered as a limitation of the present application, but should be understood as a rather detailed description of certain aspects, characteristics and embodiments of the present application.

It should be understood that the terminology described in the present application is only for describing specific embodiments and is not used to limit the present application. In addition, for the numerical range in the present application, it should be understood that each intermediate value between the upper limit and the lower limit of the range is also specifically disclosed. The intermediate value within any stated value or stated range and every smaller range between any other stated value or intermediate value within the stated range are also included in the present application. The upper and lower limits of these smaller ranges can be independently included or excluded from the range.

Unless otherwise specified, all technical and scientific terms used herein have the same meaning as commonly understood by one of ordinary skill in the art to which this application relates. Although the present application only describes the preferred methods and materials, any methods and materials similar or equivalent to those described herein can also be used in the practice or testing of the present application. All documents mentioned in this specification are incorporated by reference to disclose and describe methods and/or materials related to the documents. In case of conflict with any incorporated document, the contents of this specification shall prevail.

It is obvious to those skilled in the art that many improvements and changes can be made to the specific embodiments of the present application without departing from the scope or spirit of the present invention. Other embodiments will be apparent to the skilled person from the description of the application. The specification and embodiments of this application are only exemplary.

The terms “including”, “comprising”, “having” and “containing” used in this specification are all open terms, which means including but not limited to.

The “parts” referred to in the present application are, unless otherwise specified, expressed in mole parts.

Unless otherwise specified, the “room temperature” in the present application refers to 25 degrees Celsius (° C.).

In the present application, the particle number of the lower energy level is promoted to decrease by the energy transfer up-conversion (ETU:$^4I_{13/2}$+4$I_{13/2}$→$^2H_{11/2}$,$^4I_{15/2}$) associated with $^4I_{9/2}$ in the lower energy level through high concentration doping of erbium (Er) ions, thereby increasing the probabilities of $Er^{3+}$:$^4F_{9/2}$→$^4I_{9/2}$ transition. The reason for this is that through the ETU process, some of the particles relax from the energy level of the $^4I_{9/2}$ excited state to the ground state, reducing the particle number on $^4I_{9/2}$ and promoting the inversion of the particle number between it and the upper energy level $^4F_{9/2}$, which is conducive for the 3.5 μm laser output of $Er^{3+}$:$^4F_{9/2}$→$^4I_{9/2}$. Moreover, some of the particles are up-converted to the $^2H_{11/2}$ energy level by the ETU process and then relaxed to the $^4F_{9/2}$ energy level by multi-phonon relaxation, thereby increasing the particle number of $^4F_{9/2}$ in the upper energy level and thus promoting the process of $Er^{3+}$:$^4F_{9/2}$→$^4I_{9/2}$.

In the prior art, a glass matrix is also required to have a low phonon energy for the high-efficiency 3.5 μm laser output so as to reduce the effect of non-radiative transitions on the lifetime of the high energy level, and the fluoroindate matrix prepared by the present application has low phonon energy and wide transmission range, which are conducive to the efficient luminescence of rare earths in the mid-infrared wavelength band. However, fluoroindate glass are also confronted with the problems of being difficult to prepare and having poor thermal stability and mechanical properties; in view of that, the present application improves the thermal stability and glass forming ability of the glass by adding an appropriate amount of metaphosphate to the fluoroindate glass matrix to replace a portion of the fluoroindate as a glass former, and $Al(PO_3)_3$ is also introduced into the glass so that new network connections are developed in the glass network structure, enabling the glass structures to be more tightly connected to each other. Also, metaphosphates increase the average strength of chemical bonds in the glass network, which affects the glass characteristic temperature and thus improves the thermal stability properties. The specific technical schemes are as follows:

a laser glass doped with high concentration of mid-infrared fluoroindate, including following raw materials in parts by mole: 27-38 parts of $InF_3$, 13 parts of $ZnF_2$, 10 parts of $GdF_3$, 19 parts of $BaF_2$, 5 parts of $CaF_2$, 10 parts of $SrF_2$, 5-15 parts of $Al(PO_3)_3$ and 1-11 parts of $ErF_3$.

In some preferred embodiments, the raw materials, in parts by mole, are included as follows: 27 parts of $InF_3$, 13 parts of $ZnF_2$, 10 parts of $GdF_3$, 19 parts of $BaF_2$, 5 parts of $CaF_2$, 10 parts of $SrF_2$, 5 parts of $Al(PO_3)_3$ and 11 parts of $ErF_3$.

In some preferred embodiments, the raw materials include the following raw materials in mole parts before the Er ions are doped: 38 parts of $InF_3$, 13 parts of $ZnF_2$, 10 parts of $GdF_3$, 19 parts of $BaF_2$, 5 parts of $CaF_2$, 10 parts of $SrF_2$, and 5 parts of $Al(PO_3)_3$.

Figure 4:
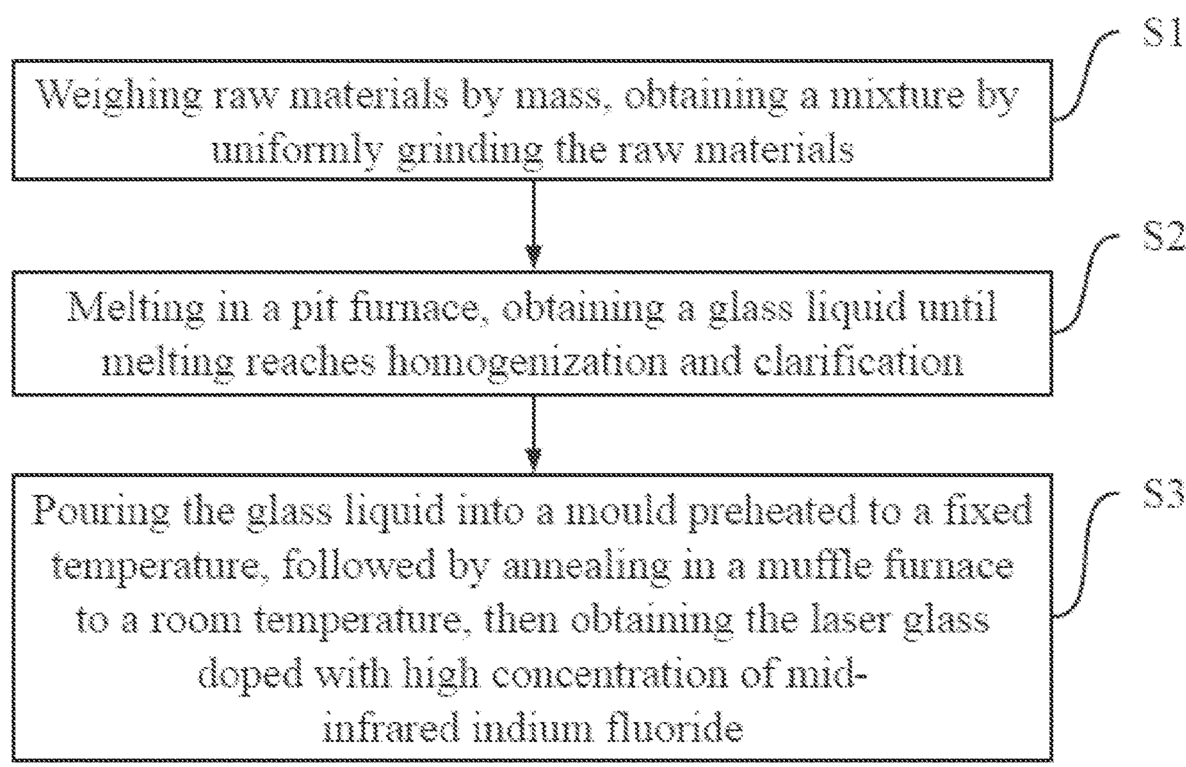
FIG. 4 is a process illustrating a preparation method of the laser glass doped with high concentration of mid-infrared fluoroindate provided by the present application.

The present application also provides a preparation method of the laser glass doped with high concentration of mid-infrared fluoroindate, including the following steps as shown in FIG. 4:

S1, weighing raw materials by mass, obtaining a mixture by uniformly grinding the raw materials;

S2, melting in a pit furnace, obtaining a glass liquid until melting reaches homogenization and clarification; and

S3, pouring the glass liquid into a mould preheated to a fixed temperature, followed by annealing in a muffle furnace for a fixed time and cooling to a room temperature, then obtaining the laser glass doped with high concentration of mid-infrared fluoroindate.

In some preferred embodiments, conditions for the melting include: melting at 900-1000° C. for 20-30 minutes (min) in a stable atmospheric environment with a constant temperature and humidity, more preferably, melting at 900° C. for 20 min; the constant temperature and humidity include temperature of 20° C. and humidity of 20%.

In a process of the melting, high-purity oxygen is introduced as atmosphere protection to remove water from the glass liquid, and a homogenized and clarified glass liquid is obtained by removing the water.

In some preferred embodiments, the mould preheated to the fixed temperature includes a temperature of 280-330° C., more preferably, it is preheated to 280° C.

In some preferred embodiments, conditions of the annealing include: holding temperature at 230-280° C. for 2-3 hours (h), more preferably, holding temperature at 250° C. for 2 h.

Embodiment 1

A preparation method of the laser glass doped with high concentration of mid-infrared fluoroindate, including:

- S1, weighing and grinding 38 mole percentage (mol %) $InF_3$, 13 mol % $ZnF_2$, 10 mol % $GdF_3$, 19 mol % $BaF_2$, 5 mol % $CaF_2$, 10 mol % $SrF_2$ and 5 mol % $Al(PO_3)_3$ (until a particle size is between 100 and 200 meshes) to obtain a mixture;
- S2, putting the mixture obtained in the S1 into a platinum crucible, then placing in a pit furnace for melting of 20 min to obtain molten glass liquid, with high-purity oxygen being introduced at all times during the melting process for atmospheric protection in order to remove the water in the glass liquid (homogenized and clarified), and removing the air bubbles in the glass liquid by stirring during the melting process; and
- S3, quickly pouring the glass liquid prepared in the S2 into a mould preheated to 280° C., then placing into a muffle furnace heated to 250° C., holding the temperature for 2 h, then closing the muffle furnace and cooling to room temperature, and obtaining the laser glass doped with high concentration of mid-infrared fluoroindate after completely cooling.

Embodiment 2

Same as Embodiment 1, with the difference that the components of the present embodiment in the S1 include: 33 mol % $InF_3$, 13 mol % $ZnF_2$, 10 mol % $GdF_3$, 19 mol % $BaF_2$, 5 mol % $CaF_2$, 10 mol % $SrF_2$ and 10 mol % $Al(PO_3)_3$.

Embodiment 3

Same as Embodiment 1, with the difference that the components of the present embodiment in the S1 include: 28 mol % $InF_3$, 13 mol % $ZnF_2$, 10 mol % $GdF_3$, 19 mol % $BaF_2$, 5 mol % $CaF_2$, 10 mol % $SrF_2$ and 15 mol % $Al(PO_3)_3$.

Embodiment 4

Same as Embodiment 1, with the difference that the components of the present embodiment in the S1 include: 37 mol % $InF_3$, 13 mol % $ZnF_2$, 10 mol % $GdF_3$, 19 mol % $BaF_2$, 5 mol % $CaF_2$, 10 mol % $SrF_2$, 5 mol % $Al(PO_3)_3$, and 1 part of $ErF_3$.

Embodiment 5

Same as Embodiment 1, with the difference that the components of the present embodiment in the S1 include: 35 mol % $InF_3$, 13 mol % $ZnF_2$, 10 mol % $GdF_3$, 19 mol % $BaF_2$, 5 mol % $CaF_2$, 10 mol % $SrF_2$, 5 mol % $Al(PO_3)_3$, and 3 parts of $ErF_3$.

Embodiment 6

Same as Embodiment 1, with the difference that the components of the present embodiment in the S1 include: 33 mol % $InF_3$, 13 mol % $ZnF_2$, 10 mol % $GdF_3$, 19 mol % $BaF_2$, 5 mol % $CaF_2$, 10 mol % $SrF_2$, 5 mol % $Al(PO_3)_3$, and 5 parts of $ErF_3$.

Embodiment 7

Same as Embodiment 1, with the difference that the components of the present embodiment in the S1 include: 31 mol % $InF_3$, 13 mol % $ZnF_2$, 10 mol % $GdF_3$, 19 mol % $BaF_2$, 5 mol % $CaF_2$, 10 mol % $SrF_2$, 5 mol % $Al(PO_3)_3$, and 7 parts of $ErF_3$.

Embodiment 8

Same as Embodiment 1, with the difference that the components of the present embodiment in the S1 include: 29 mol % $InF_3$, 13 mol % $ZnF_2$, 10 mol % $GdF_3$, 19 mol % $BaF_2$, 5 mol % $CaF_2$, 10 mol % $SrF_2$, 5 mol % $Al(PO_3)_3$, and 9 parts of $ErF_3$.

Embodiment 9

Same as Embodiment 1, with the difference that the components of the present embodiment in the S1 include: 27 mol % $InF_3$, 13 mol % $ZnF_2$, 10 mol % $GdF_3$, 19 mol % $BaF_2$, 5 mol % $CaF_2$, 10 mol % $SrF_2$, 5 mol % $Al(PO_3)_3$, and 11% parts of $ErF_3$.

Effect Embodiment 1

The fluoroindate laser glasses with different $Al(PO_3)_3$ contents prepared in Embodiments 1-3 are respectively processed into $10\times20\times1$ $mm^3$ glass sheets and polished, and are subjected to measurement of Fourier infrared transmission spectra, with results as shown in FIG. 1 and Table 1.

TABLE 1

| Embodiments | Maximum transmittance (%) | $\alpha(OH^-)$ ($cm^{-1}$) |
|---|---|---|
| Embodiment 1 | 92.13 | 0.2133 |
| Embodiment 2 | 90.15 | 0.2504 |
| Embodiment 3 | 88.65 | 0.2598 |

It can be seen from Table 1 that the fluoroindate laser glasses prepared in Embodiments 1-3 of the present application have a wide mid-infrared transmittance range, and the maximum transmittance in Embodiment 1 is 92.13%, and the hydroxyl coefficient at about 3 m is calculated as 0.2133 $cm^1$ according to the hydroxyl calculation formula:

$$\alpha(OH^-) = \frac{Ln(T_0/T)}{L},$$

where T and $T_0$ are the transmittance at the $OH^-$ absorption peak about 3 m and the maximum transmittance of the Fourier curve, respectively, and L is the thickness 1.0 mm of the glass sample. As the content of $Al(PO_3)_3$ in Embodiments 2-3 increases, the maximum transmittance of the fluoroindate glass decreases, while the hydroxyl absorption coefficient increases, suggesting that the introduction of the phosphate $Al(PO_3)_3$ affects the mid-infrared transmittance of the fluoride glass to a certain extent. In order to avoid the decrease of mid-infrared transmittance by the introduction of excess $Al(PO_3)_3$, fluoroindate glass containing 5 mol % $Al(PO_3)_3$ with less loss of hydroxyl groups is selected as the substrate for high concentration doping of $Er^3$ in Embodiments 4-9.

Effect Embodiment 2

Figure 2:
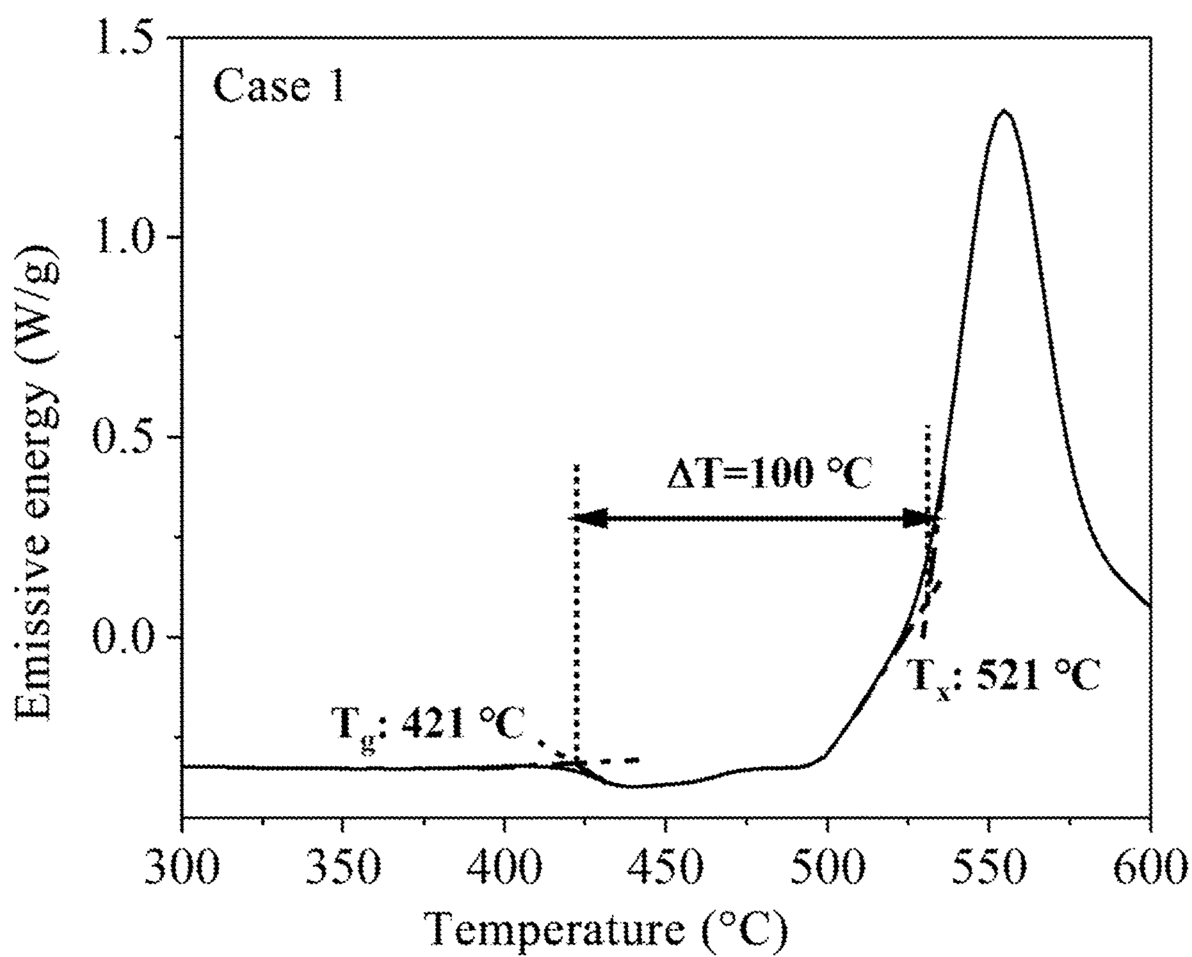
FIG. 2 shows a differential thermal analysis curve of the fluoroindate laser glass prepared in Embodiment 1 of the present application at 300-600 degrees Celsius (° C.).
Figure 3:
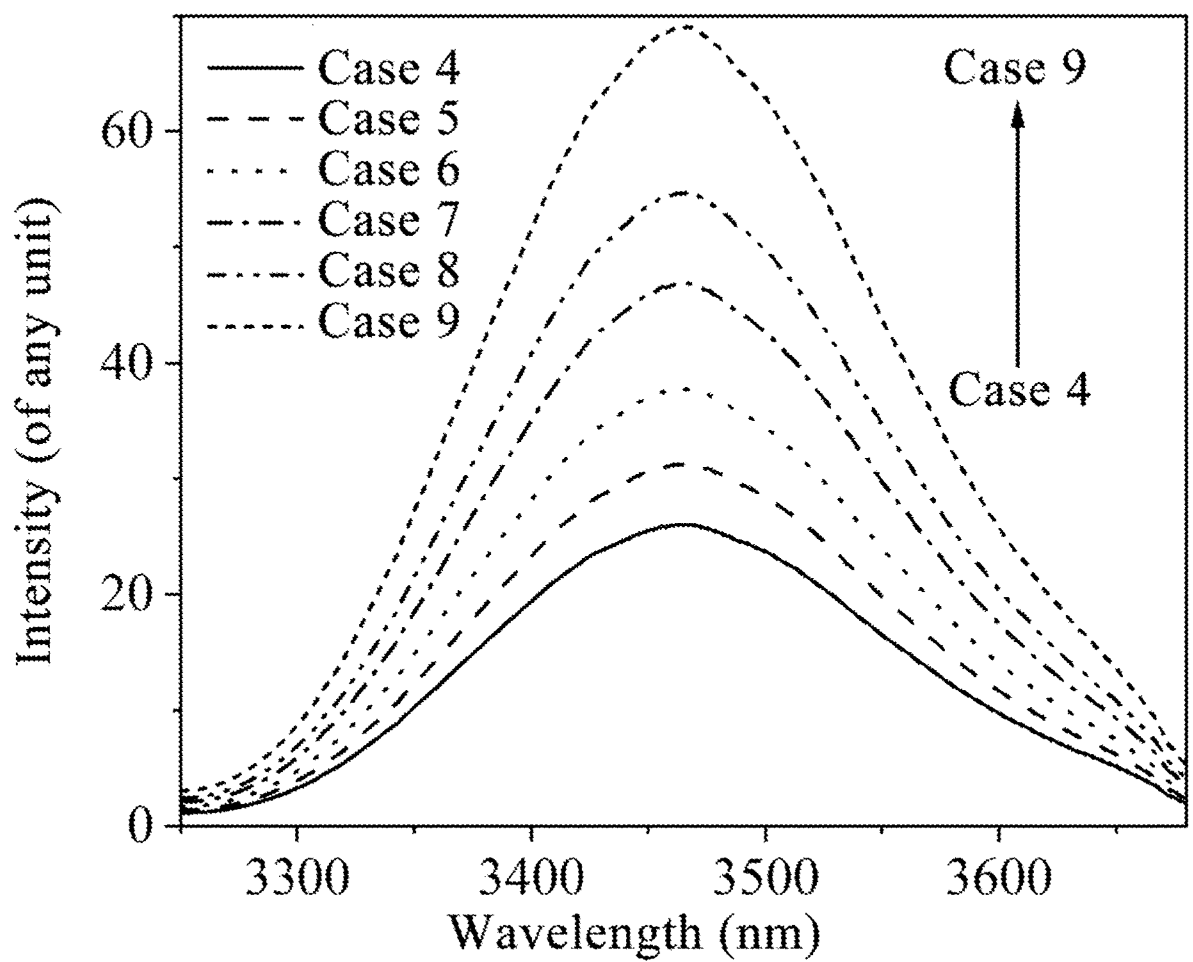
FIG. 3 is a fluorescence spectra diagram of fluoroindate laser glasses prepared in Embodiments 4-9 (corresponding to Cases 4-9 in the figure) of the present application in a range of 3200-3700 nm under a pumping of a laser diode with a wavelength of 650 nm.

The fluoride laser glasses prepared in Embodiments 1-3 are respectively processed into 10×20×1 $mm^3$ glass sheets and polished, and the Fourier infrared transmission curves are measured, with results as shown in FIG. 1; the differential thermal curve of the fluorine indium laser glass prepared in Embodiment 1 is measured, and the result is shown in FIG. 2; the fluorescence spectra of fluoroindate laser glasses prepared in Embodiments 4-9 are measured under the pumping of a laser diode with a wavelength of 650 nm, and the results are shown in FIG. 3.

As can be seen from FIG. 1, the fluoroindate laser glass prepared in Embodiment 1 of the present application has a wide mid-infrared transmittance range, with a maximum transmittance rate of 92.13%, a small hydroxyl absorption peak at about 3 μm, and a hydroxyl coefficient of 0.2133 $cm^{-1}$, with increased feasibility of using the fluoroindate glass of the present application as a 3.5 μm mid-infrared laser gaining material. The maximum transmittance rate of Embodiment 2 and Embodiment 3 of the present application reaches 90.15% and 88.65%, respectively.

As can be seen from the FIG. 2, the fluoroindate laser glass prepared in Embodiment 1 has a low glass transition temperature (421° C.) and a low glass crystallization temperature (521° C.), with good thermal stability, easy stretching into optical fiber, simple manufacturing process and low production cost; it is an ideal substrate for high-concentration mid-infrared gaining medium doping.

As can be seen from the FIG. 3, the fluoroindate laser glasses prepared in Embodiments 4-9 obtain strong $Er^{3+}$:3.5 μm luminescence under the pumping of a laser diode with a wavelength of 650 nm, the fluoroindate laser glass prepared by the present application obtains strong luminescence in the range of 3200-3700 nm with a central wavelength at about 3500 nm, based on the radiative transition between the $Er^{3+}$:$^4F_{9/2}\rightarrow{}^4I_{9/2}$ energy levels; and as the concentration of rare earth ions increases, the luminescence intensity increases without concentration quenching, indicating that the system matrix material is suitable for high concentration doping of $Er^{3+}$ to obtain excellent 3.5 μm luminescence performance.

The foregoing describes only preferred embodiments of the present application and does not serve to limit the present application, and any modifications, equivalent substitutions, improvements, etc., made within the spirit and principles of the present application shall be included in the scope of protection of the present application.

What is claimed is:

1. A laser glass doped with high concentration of mid-infrared fluoroindate, comprising following raw materials in parts by mole percentage: 27-38 parts of $InF_3$, 13 parts of $ZnF_2$, 10 parts of $GdF_3$, 19 parts of $BaF_2$, 5 parts of $CaF_2$, 10 parts of $SrF_2$, 5-15 parts of $Al(PO_3)_3$ and 1-11 parts of $ErF_3$.

2. The laser glass doped with high concentration of mid-infrared fluoroindate according to claim 1, wherein following raw materials are comprised in parts by mole percentage: 27 parts of $InF_3$, 13 parts of $ZnF_2$, 10 parts of $GdF_3$, 19 parts of $BaF_2$, 5 parts of $CaF_2$, 10 parts of $SrF_2$, 5 parts of $Al(PO_3)_3$ and 11 parts of $ErF_3$.

3. A preparation method of the laser glass doped with high concentration of mid-infrared fluoroindate according to claim 1, comprising following steps:

weighing raw materials by mass, grinding the raw materials uniformly to obtain a mixture, melting until homogenization and clarification to obtain a glass liquid; pouring the glass liquid into a mould preheated to a fixed temperature, followed by annealing treatment to a room temperature, then obtaining the laser glass doped with high concentration of mid-infrared fluoroindate.

4. A preparation method of the laser glass doped with high concentration of mid-infrared fluoroindate according to claim 2, comprising following steps:

weighing raw materials by mass, grinding the raw materials uniformly to obtain a mixture, melting until homogenization and clarification to obtain a glass liquid; pouring the glass liquid into a mould preheated to a fixed temperature, followed by annealing treatment to a room temperature, then obtaining the laser glass doped with high concentration of mid-infrared fluoroindate.

5. The preparation method of the laser glass doped with high concentration of mid-infrared fluoroindate according to claim 3, wherein conditions for the melting comprise: melting at 900-1000 degrees Celsius for 20-30 minutes in an air environment with a constant temperature and humidity.

6. The preparation method of the laser glass doped with high concentration of mid-infrared fluoroindate according to claim 3, wherein conditions of the annealing comprise: holding at 230 degrees Celsius-280 degrees Celsius for 2-3 hours.

7. The preparation method of the laser glass doped with high concentration of mid-infrared fluoroindate according to claim 4, wherein conditions for the melting comprise: melting at 900-1000 degrees Celsius for 20-30 minutes in an air environment with a constant temperature and humidity.

8. The preparation method of the laser glass doped with high concentration of mid-infrared fluoroindate according to claim 4, wherein conditions of the annealing comprise: holding at 230 degrees Celsius-280 degrees Celsius for 2-3 hours.

* * * * *